COMPLEMENTARY-TRANSISTOR LOW-LEVEL TEMPERATURE-STABILIZED REGENERATIVE SWITCH CIRCUIT UTILIZING STABISTOR INVERSE BIAS

Original Filed Aug. 25, 1958

INVENTOR.
JOHN W. HIGGINBOTHAM
BY Earl C. Hancock
AGENT

INVENTOR.
JOHN W. HIGGINBOTHAM
BY Earl C. Hancock
AGENT

United States Patent Office 3,440,446

Patented Apr. 22, 1969

3,440,446
COMPLEMENTARY-TRANSISTOR LOW-LEVEL TEMPERATURE-STABILIZED REGENERATIVE SWITCH CIRCUIT UTILIZING STABISTOR INVERSE BIAS

John W. Higginbotham, Bel Air, Md., assignor to Martin-Marietta Corporation, a corporation of Maryland Application May 15, 1963, Ser. No. 280,643, now Patent No. 3,214,678, dated Oct. 26, 1965, which is a division of application Ser. No. 756,920, now Patent No. 3,105,198, dated Aug. 25, 1958. Divided and this application Mar. 24, 1965, Ser. No. 449,914
Int. Cl. H03k *17/14, 17/60*
U.S. Cl. 307—255 4 Claims This application is a division of my copending application Ser. No. 280,643, filed May 15, 1963, now patent No. 3,214,678, which is in turn a division of application Ser. No. 756,920, filed Aug. 25, 1958, now patent No. 3,105,198.

The present invention relates to the stabilization of transistorized circuits against temperature effects, and more particularly to transistorized circuits wherein an inverse biasing network is employed to provide such stabilization.

Ideally, an amplifying device should operate effectively from full cutoff to full saturation upon progressive increase of its input current. Presently available transistors due to their temperature sensitivity exhibit leakage characteristics which prevent substantially the attainment of an off condition in the transistor output circuit when the input current is zero. However, by introducing non-linearity into the base-to-emitter circuit of such transistor, it may be operated so as to attain substantially the full off condition with zero input current over substantially the entire operating temperature range. Thus, the introduction of non-linearity into the base-to-emitter circuit makes a poor transistor perform as a relatively good transistor.

The invention makes practicable the use of presently available transistors in high gain, direct coupled and complementarily coupled transistorized circuits which operate at high temperatures, such as, for example, regulated power supplies, operational amplifiers, servo amplifiers, switching circuitry, and the like. The successful use of such circuitry requires that the transistors therein shall operate substantially within the linear portion of their operating characteristics. Heretofore, this could be effected only by maintaining the junction ambient temperature of such transistors at relatively low values. At the higher temperatures the operation of such transistors will occur largely, if not wholly, within the non-linear portion of their characteristics. As a result the use of presently available transistors has been limited.

Accordingly it is the primary object of the present invention to provide improved circuit means for stabilizing transistorized circuits including presently available transistors so that operation thereof will occur within the linear portion of their operating characteristics, even at relatively high temperatures.

The circuit means provided in accordance with the invention comprises an inverse biasing network which imparts a substantially predeterminedly controlled non-linearity to the circuit. The biasing network is connected in series circuit relation between the base and emitter electrodes of the transistor. It includes a resistive element R, connected to the base electrode, and a stabistor element S, connected to the emitter electrode. In accordance with the invention, the operation of the inverse biasing network is made extremely sensitive to the selected relative values of the resistor and stabistor elements included therein according to the following criteria defining the network: The value of the resistive element R is preselected to make the term defined by $$I_{CL}(RR_i+Rr_b+R_ir_b)$$

substantially equal to or smaller than the term $$E_S(R_i+R)$$

at a given upper operating temperature for the transistor and the circuit, where:

$I_{CL}$=the leakage current flowing through the collector electrode of the transistor,
$R_i$=the resistance of the input circuit of the transistor,
$r_b$=the resistance of the base electrode of the transistor, and
$E_S$=the D.C. voltage developed across the emitter to base and the stabistor S.

As is understood by those persons having normal skill in the art, the term "stabistor" wherever employed herein is intended to mean a semiconductor diode especially designed to meet tight tolerance limits in the forward, or conducting, direction with a minimum requirement in the reverse direction.

The effectiveness of the improved circuit derives from the recognition that a transistorized circuit employing available transistors substantially ceases to operate within the linear portion of its characteristic because of proportionate increase of leakage current through its collector electrode with increase of temperature. This leakage current is normally amplified by the transistor circuit. At relatively low temperatures the effect of the leakage current is negligible. However, at relatively high temperatures leakage current "input" to the transistor is so great as to cause the transistor to operate substantially outside its linear characteristic.

The inverse biasing network of the invention serves to introduce a non-linear control of the transistor current which in effect opposes the amplification of the undesired leakage current but which permits amplification of the input signal voltage.

The inverse biasing network of the invention may be employed to stabilize a wide variety of transistorized circuits, against temperature effects, as will be readily understood by those skilled in the art. The present invention however, further provides a number of especially designed temperature stabilized circuits of a particular advantage. The operation of the inverse bias network and the improved transistor circuitry in which it is employed will be further described in connection with the accompanying drawings in which.

Figure 1:
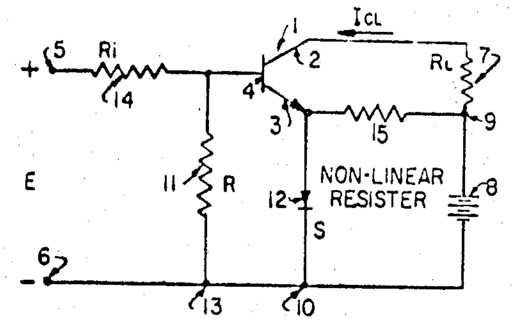
FIGURE 1 is a diagram of a transistorized circuit stabilized against temperature effects in accordance with the invention.

The invention may best be described by referring to FIGURE 1 in which it is illustrated in the form of a simple transistor amplifier circuit. This circuit includes a transistor, shown generally at 1, having collector electrode 2, an emitter electrode 3, and a base electrode 4. The transistor is provided with an input circuit which is adapted to apply an input signal voltage thereto between the base and emitter electrodes. Accordingly, terminal 5 of the input circuit is connected to the base electrode 4 while terminal 6 is connected to the emitter electrode 3. Further, the transistor is provided with an output circuit including a load impedance 7, denoted as $R_L$, and a D.C. power source 8. The output circuit is connected across the collector and emitter electrodes in order to derive an amplified output signal from the transistor. Accordingly, the load impedance 7 and power source 8 are connected in series, with the load impedance being connected to the collector electrode and the power source having its terminal 9 connected to the load impedance and its terminal 10 connected to the emitter electrode. The stabistor element may be biased by means of a resistor 15. Biasing of the stabistor is seldom necessary since in most applications $I_{CL}$ will provide sufficient biasing action to effect proper degeneration of $I_{CL}$ amplification.

Figure 1A:
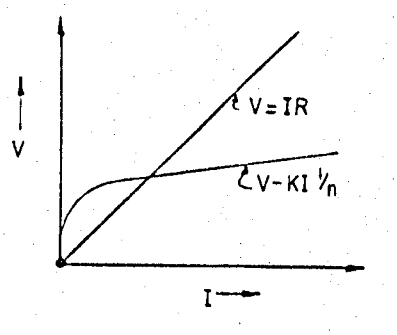
FIGURE 1A shows the voltage current relationship of a typical non-linear resistor or stabistor, such as a silicon diode, compared with that of a linear resistor.

The invention resides in the particular circuitry employed in the input means. This circuitry comprises an inverse bias network connected in series between the base and emitter electrodes. The inverse bias circuit includes a resistive element 11, denoted as R, which is connected to the base electrode, and a stabistor element 12, denoted as S, connected to the emitter electrode. In the embodiment of FIGURE 1 a diode element is employed as the stabistor element of the inverse bias circuit. This stabistor or diode exhibits an extremely non-linear impedance characteristic, its impedance being very high at low currents but decreasing logarithmically with increasing current to relatively low values as shown by the voltage current relationship plotted in FIGURE 1A. The dynamic change in resistance value (curve slope) is in the order of magnitude of ten thousand to one. The common connecting point 13 of the resistor and stabistor elements is connected in common to terminal 10 of the D.C. power source and to the input terminal 6. The input circuit is completed by a resistance 14, denoted as $R_i$, which may be considered to be the series resistance of the input circuit means.

It is the purpose of this inverse bias circuit to stabilize the transistor amplifier circuit against temperature effects. As illustrated in the diagram of FIGURE 1 there is present in every transistor circuit a certain amount of leakage current $I_{CL}$ emanating from the battery source to the collector electrode. This leakage current is converted into a voltage at the input circuit and is therefore amplified by the transistor circuit. At lower temperatures the value of this leakage current is smaller, and the effect of its amplification upon the operation of the transistor circuit, negligible. However, the value of the leakage current increases logarithmically with temperature so that at high temperatures the input voltage to the transistor derived from the leakage current may become so great as to drive the transistor out of the linear portion of its operating chaarcteristic. In fact, in some instances the amplification of the leakage current becomes so great as to destroy the transistor. The inverse bias network provided by the invention prevents the amplification of leakage current while permitting amplification of the input voltages thus stabilizing the transistor circuit against the temperature effects above described.

The operation of the inverse bias voltage in effecting this temperature stabilization may be explained as follows: The unwanted leakage current $I_{CL}$ emanating from the battery source flows through the collector electrode and the resistive element R. The resistive element thus transforms the leakage current into a predictable base voltage, which voltage varies with the temperature of operation. With the resistive element alone in the input circuit the base voltage thus created would act as an input voltage and be amplified by the transistor. To provent this creation of an input voltage across the base and emitter electrodes of the transistor and the consequent amplification resulting therefrom, the invention provides the stabistor element S. The leakage current then also flows through the stabistor element causing a second voltage which varies with the temperature. This voltage opposes the voltage created across resistive element R thereby canceling out the effect of that voltage so that the base-to-emitter electrodes of the ransistor remain at zero voltage or at a slightly reverse polarity so that no leakage current amplification is possible.

It may thus be seen that the invention has been derived from the recognition that the effects of temperature on a transistor circuit are traceable to the temperature-sensitive leakage current $I_{CL}$. The explanation given above, however, is an oversimplified one intended to provide the reader with an intuitive grasp of the manner in which the inverse bias network operates. Actually, the inverse bias network is so sensitive to the values selected for the resistive and stabistor elements of the circuit that a more rigid analysis is required. Otherwise, without the proper selection of values as provided by the invention, the circuit becomes unworkable to the extent that the desired function is not at all effected.

Figure 2:
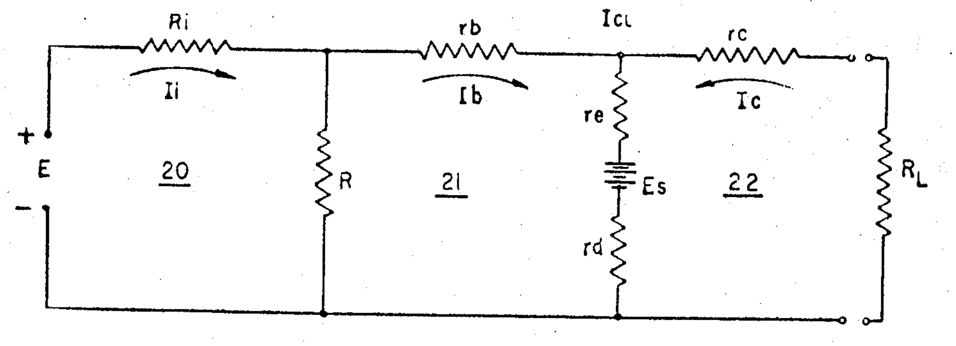
FIGURE 2 is an equivalent circuit diagram of the circuit of FIGURE 1 for purposes of analysis.

The more rigid analysis of the inverse bias network requires reference to an equivalent diagram of the transistor circuit, illustrated in FIGURE 2. The first current loop 20 includes the input voltage E, the input resistance $R_i$, and the biasing resistance R, through which flows the input current $I_i$. The second current loop 21 includes, in addition to the biasing resistance R, the base resistance $r_b$, the emitter resistance $r_e$, the voltage $E_S$ developed across the stabistor element, and the dynamic resistance $r_d$ of the diode stabistor, through which flows the base current $I_b$. The third current loop 22 includes, in addition to the emitter resistance $r_e$, the voltage $E_S$, the dynamic diode resistance $r_d$, the collector resistance $r_c$, and the load impedance $R_L$ through which flows the collector current $I_c$.

These current loops may be solved by the application of Kirchhoff's law as follows:

1.
$$I_c = BI_b + I_{CL}$$

where $B$=the common emitter transistor current gain.

From Equation 1 it can be seen that:

$$I_b = \frac{I_c - I_{CL}}{B}$$

Then for purposes of simplification and substitution in the following computations, assume that:

1A.
$$I_c' = I_c - I_{CL}$$

2.
$$E = I_i(R_i + R) - R\frac{I_c'}{B}$$

3.
$$-E_S = \frac{I_c'}{B}(R + r_b + r_e + r_d) - I_iR + I_c'(r_e + r_d) - I_{CL}\left(r_b + \frac{RR_i}{R + R_i}\right)$$

4.
$$I_c = \frac{B[ER + I_{CL}(RR_i + R_ir_b + Rr_b) - E_S(R_i + R)]}{RR_i + (r_e + r_b + r_d)(R_i + R) + B(r_e + r_d)(R_i + R)} + I_{CL}$$

Assuming that $R_i$ is large or that the circuit is driven from a current source, Equation 4 may be simplified to read:

5.
$$I_c = \frac{B[I_iR + I_{CL}(R + r_b) - E_S]}{R + (r_e + r_b + r_d) + B(r_e + r_d)} + I_{CL}$$

An inspection of Equation 4 reveals that the addition of the stabistor element in the emitter leg gives a term that permits the prevention of amplification of the leakage current through the collector electrode. This may be explained by noting that as long as the numerator of the fraction in Equation 4 remains zero or negative there will be no output of the transistor circuit, other than the unamplified leakage current $I_{CL}$, so that the amplifier circuit will be essentially at cutoff. Thus the transistor may be made to operate over the linear portion of its range by choosing the value of R so that the term $$I_{CL}(RR_i+R_ir_b+Rr_b)$$

is substantially equal to or smaller than the term $E_S(R_i+R)$ at the preselected upper operating temperature for the transistor (that is, the highest expected value of $I_{CL}$).

In order to prevent shunting the input current away from the base electrode, the value for the voltage $E_S$ across the stabistor element may have to be selected so that the value of R is much larger than the transistor input impedance. If the drift component of the leakage current $I_{CL}$ is troublesome it may be minimized by making either $E_S$, R, or both, temperature sensitive so that they track with $I_{CL}$ thereby keeping the term $$I_{CL}(RR_i+R_ir_b+Rr_b)$$

substantially equal to $E_S(R_i+R)$ for all temperatures.

It will be noted that Equation 4 reduces to Equation 5 when the transistor circuit is driven from a current source, such as a preceding transistor stage, rather than a voltage source. This is due to the fact that the value of $R_i$ may be assumed to be large under those circumstances. In most multiple stage circuits, therefore, Equation 5 may be used for all stages except the first or input stage which will in most cases be a voltage input stage.

The prime advantage of the use of the inverse bias network of the invention is that it provides complete control of leakage currents in direct-coupled amplifiers thereby increasing the usable temperature range in addition to providing greatly improved performance and reliability. For example, heretofore in high gain, high current D. C. circuitry only specially selected transistors having low leakage current characteristics have been able to be employed. This resulted in the rejection of approximately 40 percent of manufactured transistors. With the use of the inverse bias network of the present invention, however, 100 percent utilization of transistors has been enabled regardless of their leakage current characteristics. In addition, it has been found that this invention enables operation at a maximum junction temperature in the vicinity of 85° C. Which is equally as good as the normal operation experienced at room temperatures.

In one particular test a voltage regulator circuit was designed which included the inverse biasing networks of the invention. The use of this bias stabilization enabled the use of transistors so leaky as to be useless in previous such circuits. Not only did these transistors operate at higher temperatures but they did so at over twice the dynamic impedance as did the best transistors employed in conventional circuits.

The invention provides a miniaturized regenerative switching circuit which has the advantages of high sensitivity, no moving parts, and extremely fast operation. Advantageously, switching circuits may be designed to be operable by even extremely small voltage quantities by the use of regenerative feedback within the system. Such circuits are very sensitive to even the slightest triggering input signal and then by regeneration produce an output signal of usable magnitude. Because of this sensitivity a regenerative switching circuit must be extremely stable in order not to trigger itself into operation. Therefore, miniaturization by the use of transistors has been unavailable to such circuits due to the temperature instability of such elements. The inverse bias network of the invention, however, provides the means for permitting such transistorized miniaturization. An example of this stabilization technique is illustrated in the switching circuit of FIGURE 3 wheren the improved design provides further advantage in that the biasing network effects regeneration as well.

Figure 3:
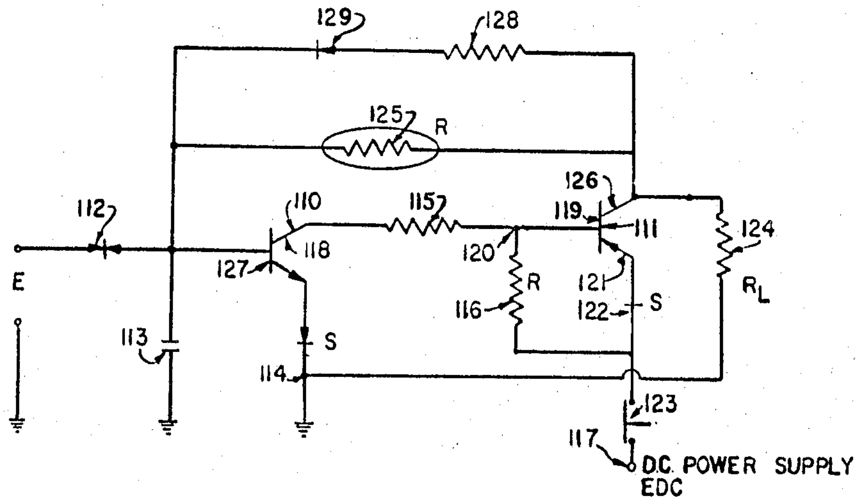
FIGURE 3 is a circuit diagram of a regenerative switcching circuit stabilized against temperature effects in accordance with the invention.

The switching circuit of FIGURE 3 employs a pair of complementary transistor types. Complementary transistors are defined as a pair of transistors one of which is of the N-P-N type and the other of which is of the P-N-P type. Either complementary type may be employed as the first stage of the switching circuit as long as the other type is used as the second state. In FIGURE 3 the first transistor stage 110 is of the N-P-N type while the second transistor stage 111 is of the P-N-P type as shown by the direction of the arrow in the emitter electrode. Transistor 110 is provided with an input circuit means, including a Zener diode 112 and a capacitor 113, connected across the base and emitter electrodes. A stabistor element, diode 114, is also connected to the emitter electrode as provided by the invention. The output circuit means for transistor 110 comprises two load resistors 115 and 116 and a D.C. power supply 117 connected in series to the collector electrode 118. The output signal from transistor 110 is therefore developed across these load resistors.

The transistor 111 also has its input circuit means connected across its emitter and base electrodes. This is effected by connecting the base electrode 119 to the common point 120 of the two load resistors and resistor 116 to the emitter electrode 121. In this way transistor 111 is made responsive to the output signal from transistor 110 as developed across load resistor 116. Emitter electrode 121 is connected through a stabistor element, diode 122, to the resistor 116 and the two in common are connected ot the D.C. power supply 117. A reset button 123 is also provided to disconnect the power supply 117 from the circuit when desired. The output circuit for transistor 111 comprises a load resistor 124 which is connected at one end to the collector electrode 126 and at the other end to the stabistor element 114. To complete the circuit a resistive element 125 is connected from the load resistor 124 to the input circuit of transistor 110 at its base electrode 127. This resistor thereby couples the output voltage of transistor 111 back to the input circuit of transistor 110.

It will be noted that the load resistor 124 of the transistor 111 and the resistor 125 form a resistive path which in series with the stabistor element 114 connects the emitter and base electrodes of transistor 110. Thus resistors 124 and 125 form a resistive element R which operates in conjunction with the stabistor element 114 to form an inverse bias network as specified by the invention. Further, it will be noted that the load resistance 116 of transistor 110 is connected as a resistive element R to form in combination with the stabistor element 122 an inverse biasing network for transistor 119 as specified by the invention.

The operation of the switching circuit is as follows: Initially, without the application of a voltage E to the input of the circuit, a voltage drop is developed across the two stabistor elements 114 and 122 as a result of current flow from the D.C. power supply 117. The values of the circuit elements should be selected so that the voltage thus developed across the stabistor elements is sufficient to hold the transistor elements at cutoff thereby preventing any triggering of the circuit into operation. It is at this point that the temperature stabilization provided by the inverse biasing networks of the invention operates to prevent premature triggering of the circuit into operation. This can be explained by noting that the cutoff voltage could be overcome by a voltage developed at the input of the transistors due to a temperature inspired leakage current $I_{CL}$. The inverse biasing network, however, prevents such premature triggering by counteracting the voltage-producing effects of the leakage current as hereinbefore described. To effect such counteraction the values of the elements of the inverse biasing networks must, of course, be selected in accordance with the equations above established. Further, the capacitor at the input circuit of the first transistor is provided to prevent transient surges from prematurely turning the circuit on. To further insure stabilization the resistive element 125 may advantageously be a thermistor in order to partially track the temperature change of the leakage current.

This non-linear condition will remain thus quiescent until an external voltage E is applied at the input of the circuit. The voltage E causes current to flow through the resistor 125 and the load resistor 124 causing a voltage drop thereacross. When the value of this voltage drop exceeds the value of the cutoff voltage across stabistor element 114 plus the voltage necessary to overcome the non-linearity of base electrode 127, a base current will flow through transistor 110. This base current causes a larger output current to flow from the collector electrode 118 through its load resistances 115 and 116. When this output current becomes large enough to cause a voltage drop across load resistor 116 in excess of the value of the cutoff voltage across stabistor element 122, plus the voltage necessary to overcome the non-linearity of vase electrode 119, a base current will flow through transistor 111. This base current will then be amplified causing a larger output current to flow from the collector electrode 126 through its load resistor 124. Thus the original voltage drop across resistor 124 causing a base current to flow in transistor 110 is increased. A larger base current is then supplied to transistor 110 through resistor 125 causing even further amplification in the circuit. This regenerative action will continue until the circuit saturates. Resetting the switching circuit may be accomplished by disconnecting the D.C. voltage source by the use of the reset switch 123.

It will thus be seen that the resistive elements 116, 124, and 125 not only function in the inverse bias networks required in order to permit sensitive regeneration to be employed, but that they function to produce the regenerative action as well.

Figure 4:
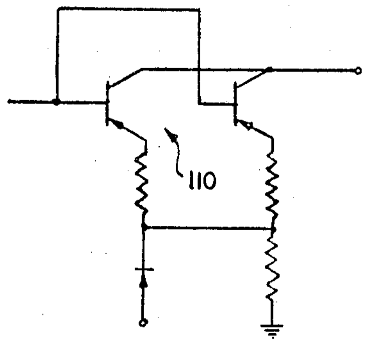
FIGURE 4 is a diagram of a parallel transistor arrangement which may be employed in the circuit of FIGURE 3.

Another advantage of the switching circuit of the invention is that it is capable of switching high voltage and current quantities. Thus, if an output current of $E_{DC}/R_L$ can be provided by the amplifier circuit, where:

$R_L$=the value of load resistor 124, and
$E_{DC}$=the voltage output of power supply 117, the full value of the power supply may be delivered to the output load. This requires only that the value of resistor 125 be made small enough to permit a base current to flow in transistor 110 large enough to produce an output current of $E_{DC}/R_L$. If it is desired to provide even higher output currents either the first stage, the second stage, or both, may be formed of two transistors connected in parallel as illustrated in FIGURE 4.

It should be noted, however, that in the case of high current loads the value of resistor 125 necessary to provide current saturation may be so low as to require excessive current to provide the voltage drop initially necessary to turn on the circuit as hereinbefore described. If this condition is found to exist, the resistor 125 may be deprived of its feedback function and employed only to turn on the circuit. Feedback is then effected by a series network of a resistor of low value 128 and a diode 129 connected in parallel across the resistor 125. The diode 129 should be polarized so that the initiating current does not flow through the feedback but does flow through the larger value resistance 125 thus turning on the circuit with little current. The feedback function is then effected by the lower value resistance 128 due to the polarization of diode 129 permitting current flow in the feedback direction, the much lower resistive value of the feedback network acting as a bypass of resistor 125.

In addition to the above-recited advantages of the switching circuit of FIGURE 3 a further advantage is found in that no limit exists with respect to the number of parallel and series transistors which may be employed in the circuit. This is due to the fact that the inverse biasing networks overcome the build-up of leakage current due to the amplification regardless of the number of transistors employed.

Figure 5:
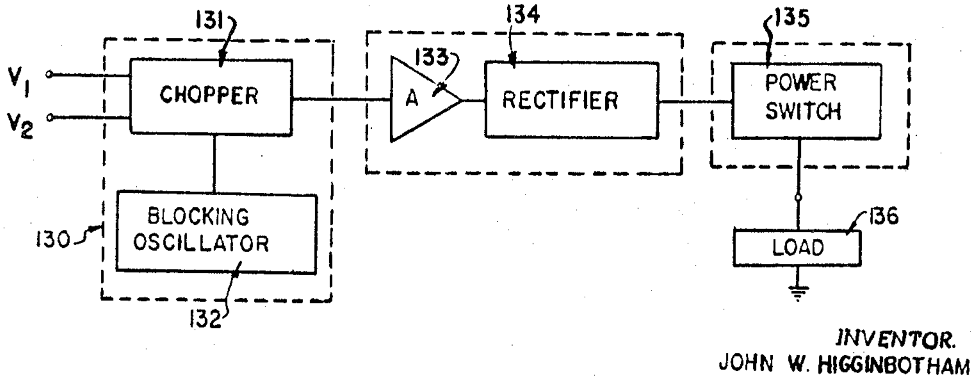
FIGURE 5 is a block diagram of a voltage comparator circuit employing the switching circuit of FIGURE 3.

The switching circuit of the invention may advantageously be employed in a D.C. voltage comparator. Such a circuit is illustrated in block diagram form in FIGURE 5. The comparison and any required amplification are preferably effected through the use of A.C. techniques. This is due to the fact that transistors, like vacuum tubes, do not lend themselves to driftless D.C. amplification as hereinbefore noted. Thus, the D.C. voltages to be compared, $V_1$ and $V_2$, are first applied to a modulator 130 in the form of a chopper 131 driven by an oscillator 132. The modulator produces an A.C. output signal which is representative of the difference between the two input signals. Prior to the transistor, electromagnetic choppers were employed to convert D.C. signals to A.C. signals. These devices restricted the carrier frequency of the A.C. output to a few kilocycles thereby restricting the amplifier bandwidth and response speed. Transistor circuits, however, provide a solution to this problem. For example, a square loop core transistor oscillator can be made to operate as plocking oscillator 132 at frequencies well up to 20 kilocycle square waves. The output from such an oscillator supplied to the chopper 131 provides a modulator which will operate at the oscillator output frequency. Thus the output of the chopper is an A.C. voltage running at a relatively high frequency.

This output is applied to an A.C. amplifier 133 which because of its A.C. characteristics is relatively driftless. The output of the amplifier is then applied to a rectifier 134 which converts the A.C. signal back to a proportional D.C. output voltage. Rectification is employed rather than modulation in this particular case since the comparator is connected only with the magnitude of errors and not their polarity.

The combination of modulator, A.C. amplifier, and rectifier as described provide an excellent driftless D.C. amplifier. Since the carrier frequency is high, excellent bandwidth is obtained, and because the A.C. amplifier is made to pass square waves, the filtering required is almost negligible.

Finally, the D.C. output of rectifier 134 is applied to the switching circuit of FIGURE 3 shown as block 135. It is the function of the switch to trigger when the difference in value of the voltages $V_1$ and $V_2$ exceeds a certain preselected maximum and to drive an output load 136 when thus triggered. This may be done by setting the threshold level required to overcome the initial cutoff condition of the switching circuit at the value of the D.C. output voltage produced by the rectifier 134 when the output of the chopper 131 is the specified maximum difference. Because of its regenerative action the switch is very sensitive to minute variations above the threshold value and, at the same time, capable of producing a large output voltage to operate the load 136. A Zener diode, 112 in FIGURE 3, is advantageously used between the rectifier output and the switch to minimize the drift of the threshold level of the circuit once it has been set.

A tested comparator circuit in accordance with the invention was designed to monitor two D.C. voltages continuously. This circuit was able to be triggered by a difference between the input voltages $V_1$ and $V_2$ of 100 microvolts for as little a time duration as 300 microseconds and to further deliver up to 2 amperes of current to a load. As hereinbefore described the output current can be increased by the parallel operation of transistors and the addition of more stages in the switching circuit.

Preferred embodiments of the invention have been described. Various changes and modifications may be made without departing from the scope of the invention as defined in the claims.

What is claimed is:

1. A regenerative switching circuit stabilized against temperature effects comprising a first transistor having a base, an emitter, and a collector electrode, a first input circuit means for said first transistor connected to apply an input switching signal between said base and emitter electrodes, a first output circuit means for said first transistor including a first load resistor and a D.C. power source connected to derive an output signal from said collector electrode, a second transistor complementary to said first transistor and having a base, an emitter, and a collector electrode, a second input circuit means connected across the base and emitter electrodes of said second transistor and to the collector electrode of said first transistor to be responsive to the output signal therefrom, a second output circuit means for said second transistor including a second load resistor connected to derive an output signal from the collector electrode of said second transistor, a feedback network including a feedback resistive element connecting the collector electrode of said second transistor to the said first input circuit to make the said first transistor responsive to the output signal from said second transistor thereby to regeneratively produce an output voltage across said second load resistor in response to the input switching signal at said first input circuit, and inverse biasing networks for stabilizing the operation of each of said transistors with variations in temperature, a separate one of said inverse biasing networks being connected in series circuit relation between the base and emitter electrodes of each said transistor and including a resistive element S connected to said emitter electrode, the value of said resistive element R being preselected to make the term defined by $I_{CL}(RR_1+R_1r_b+Rr_b)$ substantially equal to or smaller than the term $E_S(R_1+R)$ at a given upper operating temperature for the said transistor associated therewith, where:

$I_{CL}$=the collector leakage current of said transistor, $R_1$=the resistance of the input circuit means of said transistor, $r_b$=the base resistance of said transistor, and $E_S$=the D.C. voltage developed across the emitter to base and the stabistor element S of said transistor, the resistive element R for said first transistor including the said load resistor of said second transistor and the said feedback resistive element, and the resistive element R for said second transistor including the load resistor of said first transistor.

2. A regenerative switching circuit in accordance with claim 1 in which said stabistor elements are diodes.

3. A regenerative switching circuit is accordance with claim 1 which further includes a polarizing element in said feedback network connected to permit current flow in the feedback direction only, and a triggering resistive element having a higher value relative to the value of the said feedback resistive element connected in parallel with said feedback network.

4. A regenerative switching circuit bias stabilized against temperature effects, comprising a first transistor having a base, an emitter, and a collector electrode, a first input circuit means for said first transistor connected to apply an input switching signal between said base and emitter electrodes, a first output circuit means for said first transistor for deriving an output signal from said collector electrode including a first load resistor connected to said collector electrode and a D.C. power source connected in series with said first load resistor at a first common circuit point, a second transistor complementary to said first transistor and having a base, an emitter, and a collector electrode, a second input circuit means for said second transistor wherein the emitter electrode of said second transistor is connected to said first common circuit point and the base electrode of said second transistor is connected to the collector electrode of said first transistor to be responsive to the output signal therefrom, a second output circuit means for said second transistor including a second load resistor connected to derive an output signal from the collector electrode of said second transistor, a feedback network including a feedback resistive element connecting the collector electrode of said second transistor to the said first input circuit to make the said first transistor responsive to the output signal from said second transistor thereby to regeneratively produce an output voltage across said second load resistor in response to the input switching signal at said first input circuit, and inverse biasing networks for stabilizing the operation of each of said transistors with variations in temperature, a separate one of said inverse biasing networks being connected in series circuit relation between the base and emitter electrodes of each said transistor and including a resistive element R connected to said base electrode, and a stabistor element S connected to said emitter electrode, the value of said resistive element R being preselected to make the term defined by $I_{CL}(RR_1+R_1r_b+Rr_b)$ substantially equal to or smaller than the term $E_S(R_1+R)$ at a given upper operating temperature for the said transistor associated therewith, where:

$I_{CL}$=the collector leakage current of said transistor, $R_1$=the resistance of the input circuit means of said transistor, $r_b$=the base resistance of said transistor, and $E_S$=the D.C. voltage developed across the emitter to base and the stabistor element S of said transistor, the resistive element R for said first transistor including the said load resistor of said second transistor and the said feedback resistive element, and the resistive element R for said second transistor including the load resistor of said first transistor.

No references cited.

ARTHUR GAUSS, *Primary Examiner.*

R. H. PLOTKIN, *Assistant Examiner.*

U.S. Cl. X.R.

307—229, 288, 310, 297